(12) United States Patent
Cho et al.

(10) Patent No.: US 10,061,429 B2
(45) Date of Patent: Aug. 28, 2018

(54) TOUCH DISPLAY DEVICE AND METHOD OF DRIVING THE SAME

(71) Applicant: LG Display Co., Ltd., Seoul (KR)

(72) Inventors: Sungyong Cho, Seoul (KR); JongHee Hwang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 34 days.

(21) Appl. No.: 15/224,129

(22) Filed: Jul. 29, 2016

(65) Prior Publication Data
US 2017/0031506 A1 Feb. 2, 2017

(30) Foreign Application Priority Data

Jul. 31, 2015 (KR) ........................ 10-2015-0109167

(51) Int. Cl.
*G06F 3/044* (2006.01)
*G06F 3/041* (2006.01)
*G02F 1/1333* (2006.01)

(52) U.S. Cl.
CPC ............ *G06F 3/0416* (2013.01); *G06F 3/044* (2013.01); *G06F 3/0412* (2013.01); *G02F 1/13338* (2013.01)

(58) Field of Classification Search
CPC ...... G06F 3/0416; G06F 3/044; G06F 3/0412; G02F 1/13338
See application file for complete search history.

(56) References Cited

U.S. PATENT DOCUMENTS

| | | | |
|---|---|---|---|
| 2011/0037726 A1* | 2/2011 | Lee | G06F 3/0414 345/174 |
| 2011/0216039 A1* | 9/2011 | Chen | G06F 3/0412 345/174 |
| 2012/0056835 A1* | 3/2012 | Choo | G06F 3/0412 345/173 |
| 2013/0147735 A1* | 6/2013 | Kim | G06F 3/041 345/173 |
| 2014/0049506 A1* | 2/2014 | Lin | B32B 37/12 345/174 |
| 2014/0062934 A1* | 3/2014 | Coulson | G06F 3/044 345/174 |
| 2014/0347315 A1* | 11/2014 | Mo | G06F 3/044 345/174 |
| 2014/0362033 A1* | 12/2014 | Mo | G06F 3/0416 345/174 |
| 2015/0049064 A1* | 2/2015 | Shin | G06F 3/0418 345/178 |
| 2016/0202790 A1* | 7/2016 | Yang | G06F 3/0412 345/174 |
| 2016/0299598 A1* | 10/2016 | Yoon | G06F 3/044 |
| 2016/0370926 A1* | 12/2016 | Lee | G06F 3/0412 |

\* cited by examiner

*Primary Examiner* — Premal R Patel
(74) *Attorney, Agent, or Firm* — Birch, Stewart, Kolasch & Birch, LLP

(57) ABSTRACT

A touch display device can include a touch panel having a plurality of subpixels, arranged between a first substrate and a second substrate, and a plurality of touch sensors arranged in units of a certain number of subpixels; an elastic layer on the second substrate; a display driver for supplying image signals to the plurality of subpixels, respectively; and a touch driver for supplying a touch driving signal to the plurality of touch sensors and sensing a touch position and a touch pressure which is applied when a touch is input to the touch panel, based on a capacitance variation of each of the plurality of touch sensors.

18 Claims, 7 Drawing Sheets

TOUCH DISPLAY DEVICE AND METHOD OF DRIVING THE SAME

CROSS-REFERENCE TO RELATED APPLICATIONS

This application claims the benefit of the Patent Application No. 10-2015-0109167 filed in the Republic of Korea on Jul. 31, 2015, which is hereby incorporated by reference as if fully set forth herein.

BACKGROUND OF THE INVENTION

Field of the Invention

The present invention relates to a touch display device for sensing a touch position and a force and a method of driving the same.

Discussion of the Related Art

Instead of input devices such as a mouse or a keyboard which is conventionally applied as an input device for liquid crystal display (LCD) devices, a touch panel that enables a user to directly input information through a screen with a finger or a pen is being applied to display devices. Since all users can easily manipulate the touch panel, the application of the touch panel is being expanded.

Recently, LCD devices to which a touch panel is applied are being developed in a type where a touch sensor is built into a liquid crystal panel, for slimming the LCD devices. In the following description, the touch panel denotes that the touch sensor is built into a display panel (or a liquid crystal panel or an organic light emitting diode (OLED) panel).

Touch panels are categorized into a resistive type, a capacitance type, an infrared type, etc. depending on a touch sensing method. Recently, since the capacitance type touch panel provides convenience in a manufacturing process and is good in touch sensitivity, the capacitance type touch panel is attracting much attention. Capacitance type touch panels are categorized into a mutual capacitance type and a self-capacitance type.

Figure 1:
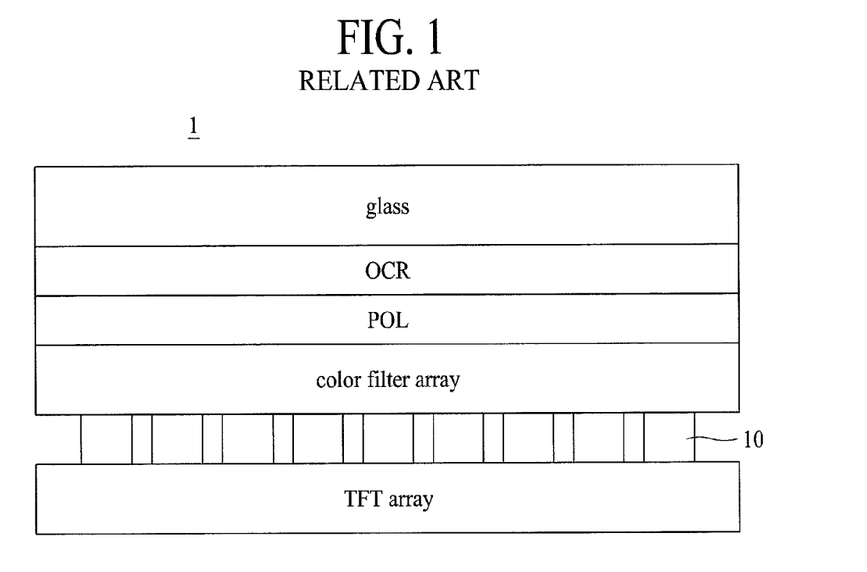
FIG. 1 is a diagram schematically illustrating a cross-sectional structure of a related art touch panel.

FIG. 1 is a diagram schematically illustrating a cross-sectional structure of a related art touch panel 1.

Referring to FIG. 1, the related art touch panel 1 includes a lower substrate on which a plurality of pixels and a thin film transistors (TFT) array are provided, an upper substrate on which a color filter array is provided, a polarizing film, and glass. A pixel electrode and a common electrode are provided on the lower substrate (a TFT array substrate). In this instance, the common electrode is used for display, and moreover, is used as a touch electrode.

Figure 2:
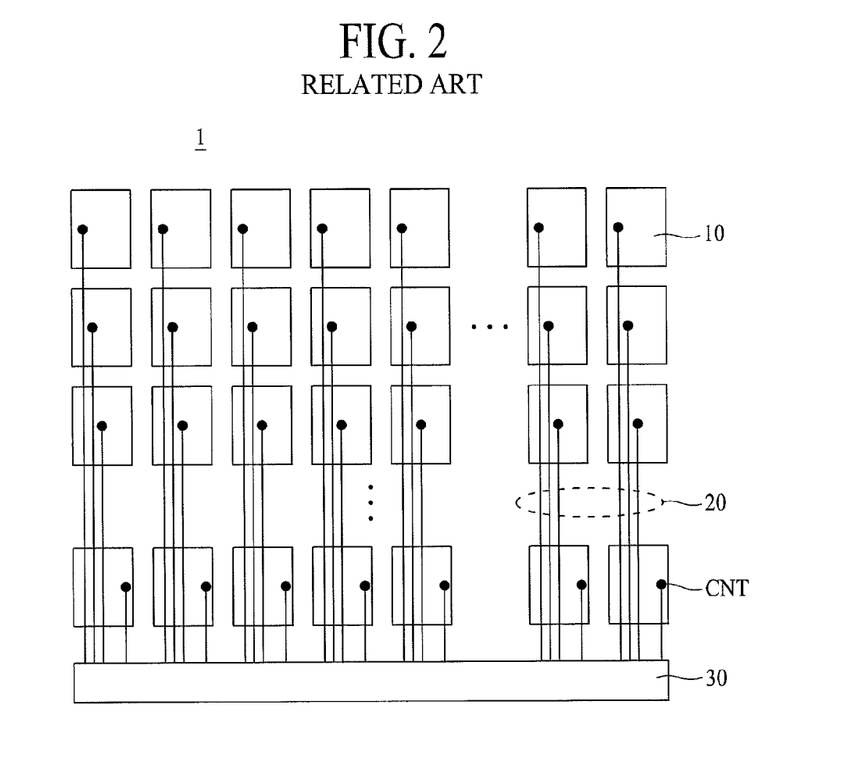
FIG. 2 is a diagram schematically illustrating touch electrodes of the related art touch panel.

FIG. 2 is a diagram schematically illustrating touch electrodes of the related art touch panel 1. In FIG. 2, the touch panel 1 having an all point self-capacitance touch type where all touch electrodes are sensed in a self-capacitance type is illustrated.

Referring to FIG. 2, a plurality of touch electrodes 10 are formed by grouping the common electrode in units of a plurality of pixels. In order to sense a touch applied to all of the plurality of touch electrodes 10, the touch electrodes 10 are respectively connected to a touch driver 30 through a plurality of conductive lines 20.

The touch panel 1 having the all point self-capacitance touch type divides one frame period into a display period and a touch period and performs a display driving operation and a touch sensing operation in a time division type.

In the display period, a pixel voltage is supplied to the pixel electrode, and a common voltage is supplied to the common electrode (the touch electrode), thereby displaying an image. Also, in the touch period, a touch driving signal is supplied to the touch electrodes 10 corresponding to the common electrode, and then, a capacitance of each of the touch electrodes 10 is sensed, thereby determining whether there is a touch and detecting a touch position. In the related art touch panel 1, since only a touch position based on the presence of a touch is detected, a user interface provided to a user is simple.

Recently, interest in touch panels for sensing a force, applied thereto when a touch is being performed, in addition to determining whether there is a touch and detecting a touch position is increasing. Therefore, a touch panel for sensing a touch position and a force is disclosed in Korean Patent Registration No. 10-1033154. However, since the touch panel should individually include a first sensing unit for detecting a touch position and a second sensing unit for sensing a touch force, the touch panel is thick in thickness and is high in manufacturing cost.

SUMMARY OF THE INVENTION

Accordingly, the present invention is directed to provide a touch display device and a method of driving the same that substantially obviate one or more problems due to limitations and disadvantages of the related art.

The inventors of the application have recognized the above-described problems and have proposed the following technical solution.

An aspect of the present invention is directed to provide a touch display device for sensing a touch position and a force and a method of driving the same.

Another aspect of the present invention is directed to provide a touch display device and a method of driving the same, which senses a touch position and a touch force by using a plurality of touch sensors which are arranged in an in-cell touch type.

Another aspect of the present invention is directed to provide a touch display device in which a plurality of touch sensors for sensing a touch position and a touch force are arranged in an in-cell touch type, and thus, a thickness is reduced.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch display device including a touch panel and a touch driving circuit unit. An elastic layer is disposed on the second substrate, and a cover glass is disposed on the elastic layer. The touch panel includes a plurality of subpixels, arranged between a first substrate and a second substrate, and a plurality of touch sensors arranged in units of a certain number of subpixels. The touch driving circuit unit includes a timing controller, a display driver, and a touch driver. The display driver supplies image signals to the plurality of subpixels, respectively. Also, the touch driver supplies a touch driving signal to the plurality of touch sensors and senses a touch position and a touch pressure which is applied when a touch is being performed, based on a capacitance variation of each of the plurality of touch sensors.

The touch display device according to an embodiment of the present invention may further include a plurality of switches electrically connecting touch sensors which are adjacent to each other in up, down, left, and right directions.

When a touch is sensed from a first touch sensor among the plurality of touch sensors, the touch driver may turn on a plurality of switches disposed between the first touch sensor and a plurality of second touch sensors surrounding the first touch sensor to electrically connect the first touch sensor to the plurality of second touch sensors, and turns on switches disposed between adjacent second touch sensors among the plurality of second touch sensors surrounding the first touch sensor to electrically connect the adjacent second touch sensors among the plurality of second touch sensors surrounding the first touch sensor to each other. The touch driver may supply the touch driving signal to the first touch sensor and the plurality of second touch sensors. The touch driver may sense the pressure which is applied when the touch is being performed, based on capacitance variations of the first touch sensor and the plurality of second touch sensors.

The touch display device according to an embodiment of the present invention may sense the pressure which is applied when the touch is being performed, based on a variation of a capacitance caused by the change in thickness of the elastic layer.

A permittivity of the elastic layer is adjusted to 1 to 3.

In the touch display device according to an embodiment of the present invention, an area of each of the plurality of touch sensors may be adjusted to 3.5 mm$^2$ to 4.5 mm$^2$.

In another aspect of the present invention, there is provided a method of driving a touch display device including supplying a touch driving signal to a plurality of touch sensors arranged in a touch panel. Subsequently, the method may sense a touch position, based on a capacitance variation of each of the plurality of touch sensors. Also, when a touch is sensed from a first touch sensor among the plurality of touch sensors, the method may electrically connect the first touch sensor to a plurality of second touch sensors surrounding the first touch sensor. Subsequently, the method may supply the touch driving signal to the first touch sensor and the plurality of second touch sensors. Subsequently, the method may sense pressure which is applied when a touch is being performed, based on capacitance variations of the first touch sensor and the plurality of second touch sensors.

The method of driving a touch display device according to an embodiment of the present invention may divide the pressure, which is applied when the touch is being performed, into two or more levels and provide various user interfaces according to pressure levels.

The method of driving a touch display device according to an embodiment of the present invention may supply the touch driving signal to nine touch sensors including the first touch sensor and sense the pressure which is applied when the touch is being performed, based on capacitance variations of the nine touch sensors.

The method of driving a touch display device according to an embodiment of the present invention may supply the touch driving signal to twenty-five touch sensors including the first touch sensor and sense the pressure which is applied when the touch is being performed, based on capacitance variations of the twenty-five touch sensors.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EMBODIMENTS

Reference will now be made in detail to the embodiments of the present invention, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a," "an" and "the" are intended to include the plural forms as well, unless the context clearly indicates otherwise. The terms "first" and "second" are for differentiating one element from the other element, and these elements should not be limited by these terms. It will be further understood that the terms "comprises," "comprising," "has," "having," "includes" and/or "including," when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

LCD devices have been variously developed in a twisted nematic (TN) mode, a vertical alignment (VA) mode, an in-plane switching (IPS) mode, and a fringe field switching (FFS) mode depending on to a method of adjusting the alignment of liquid crystal.

Among the modes, the TN mode and the VA mode are modes in which a pixel electrode is disposed on a lower substrate, and a common electrode is disposed on an upper substrate (a color filter array substrate), thereby adjusting the alignment of liquid crystal with a vertical electric field.

The IPS mode and the FFS mode are modes in which a pixel electrode and a common electrode are disposed on a lower substrate, and the alignment of liquid crystal is adjusted with an electric field between the pixel electrode and the common electrode.

The IPS mode is a mode in which a plurality of pixel electrodes and a plurality of common electrodes are alternately arranged in parallel, and thus, a lateral electric field is generated between a pixel electrode and a common electrode adjacent to each other, thereby adjusting the alignment of liquid crystal. The IPS mode has a problem where since alignment of the liquid crystal layer is not adjusted over the pixel electrode and the common electrode, a light transmittance is reduced in a corresponding area.

The FFS mode has been proposed for solving the problem of the IPS mode. The FFS mode is a mode in which a pixel electrode and a common electrode are provided in plurality to be spaced apart from each other with an insulating layer therebetween. In this instance, one electrodes of the pixel electrodes and common electrodes are formed in a plate shape or a pattern, and the other electrodes are formed in a finger shape. The FFS mode is a mode that adjusts the alignment of liquid crystal with fringe fields generated between the pixel electrodes and common electrodes.

A mode of a touch display device including a touch panel according to an embodiment of the present invention is not limited, and a vertical alignment mode (the TN mode and the VA mode) and an in-plane switching mode (the IPS mode and the FFS mode) may be applied to the touch display device according to an embodiment of the present invention.

Hereinafter, a touch display device including a touch panel and a method of driving the same according to embodiments of the present invention will be described in detail with reference to the accompanying drawings.

The touch display device according to an embodiment of the present invention may be applied to monitors such as navigations, industrial terminals, notebook computers, financial automation equipment, game machines, etc. Also, the touch display device according to an embodiment of the present invention may be applied to portable terminals such as portable phones, MP3 players, PDAs, PMPs, PSPs, portable game machines, DMB receivers, tablet personal computers (PCs), etc. Also, the touch display device according to an embodiment of the present invention may be applied to home appliances such as refrigerators, microwave ovens, and washing machines.

Figure 3:
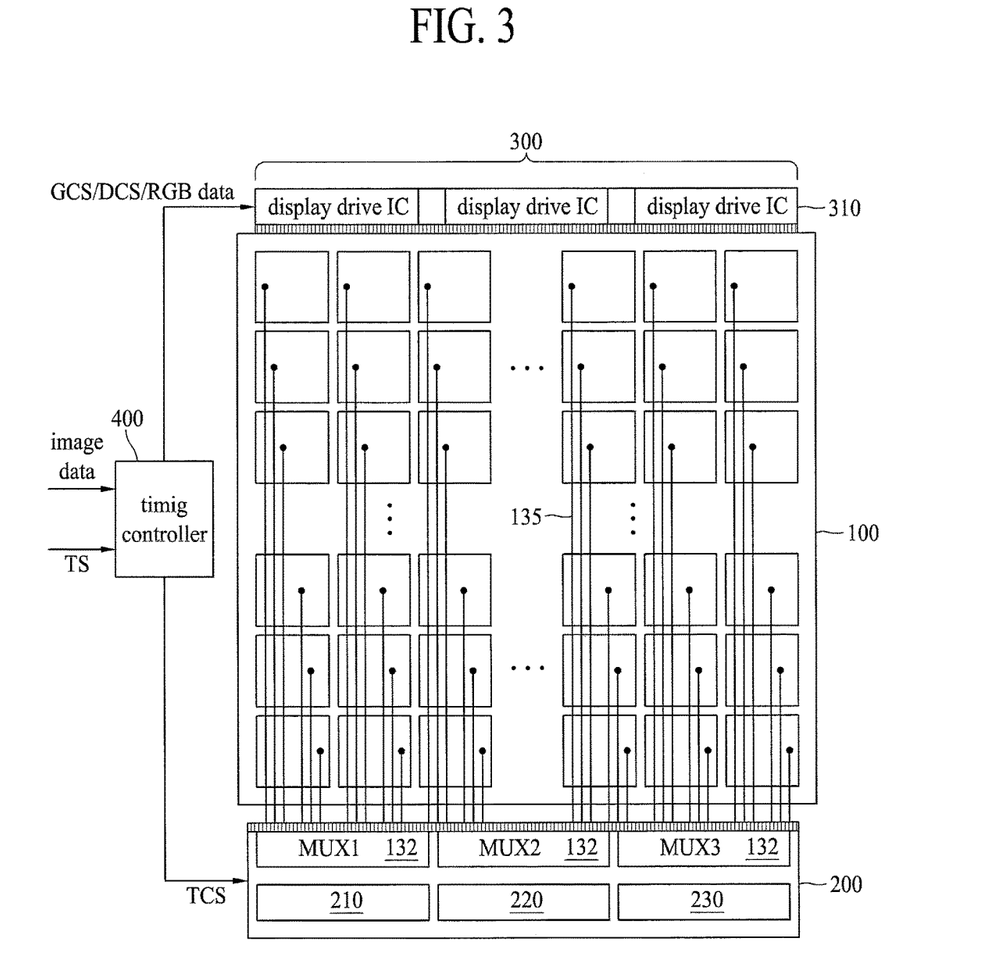
FIG. 3 is a diagram illustrating a touch display device according to an embodiment of the present invention.

FIG. 3 is a diagram illustrating a touch display device according to an embodiment of the present invention.

Referring to FIG. 3, the touch display device according to an embodiment of the present invention may include a touch panel 100, a touch driver 200, a display driver 300, a timing controller 400, a backlight unit, and a power supply. The backlight unit may supply light to the touch panel 100, and the power supply may supply power necessary for driving the touch panel 100, the touch driver 200, and the display driver 300. In FIG. 3, the backlight unit and the power supply are not illustrated.

Figure 4:
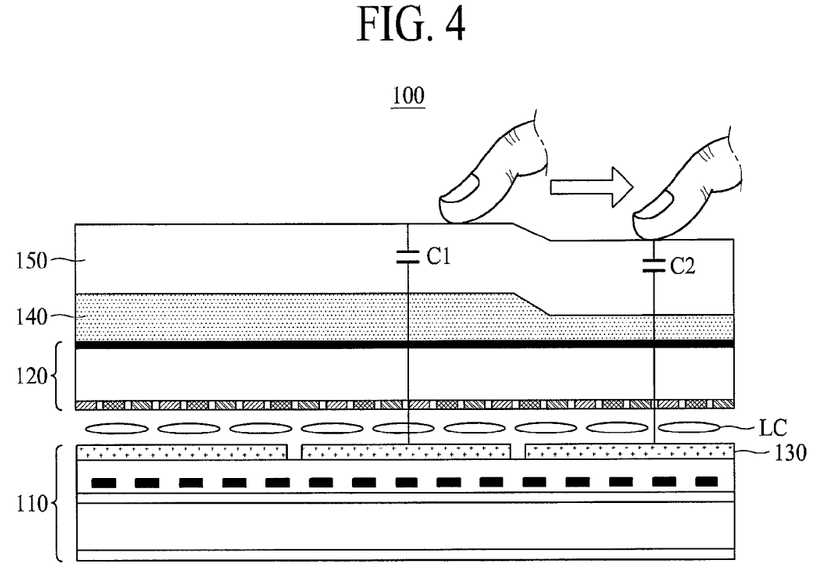
FIG. 4 illustrates a touch panel of a touch display device according to an embodiment of the present invention and is a diagram illustrating a thickness change of an elastic layer caused by a force applied to the touch panel when a touch is being performed.

FIG. 4 illustrates the touch panel 100 of the touch display device according to an embodiment of the present invention and is a diagram illustrating a thickness change of an elastic layer caused by a force applied to the touch panel 100 when a touch is being performed.

Referring to FIG. 4, the touch panel 100 may include a thin film transistor (TFT) array substrate (a first substrate) 110, a color filter array substrate (a second substrate) 120, a liquid crystal layer, an elastic layer 140, and a cover glass 150. The touch panel 100 may include a liquid crystal panel and a touch sensor 130 which are coupled to each other, and the touch sensor 130 may be built into the touch panel 100 in an advanced in-cell touch (AIT) type.

A plurality of subpixels may be arranged in a matrix type on the TFT array substrate 110 and may be defined by a plurality of data lines and a plurality of gate lines which intersect each other. A TFT and a storage capacitor Cst may be provided in each of a plurality of areas defined by intersections of the data lines and the gate lines. Also, a pixel electrode and the touch sensor 130 may be provided in each of the subpixels of the TFT array substrate 110. The pixel electrode and the touch sensor 130 may be formed of a transparent conductive material such as indium tin oxide (ITO).

Here, the touch sensor 130 may be provided in plurality, and the plurality of touch sensors 130 may each be provided in an area corresponding to a plurality of pixels. For example, each of the plurality of touch sensors 130 may be disposed in an area which corresponds to forty pixels in a horizontal direction and twelve pixels in a vertical direction. That is, one touch sensor 130 may be disposed in an area corresponding to 480 pixels. However, the present embodiment is not limited thereto, and a size of each of the touch sensors 130 may be modified based on a size of the touch panel 100 and desired touch performance. The plurality of touch sensors 130 may not be disposed in the same size, and for example, the touch sensors 130 disposed in an outer portion (edges of four surfaces) of the touch panel 100 may be smaller in size than the touch sensors 130 disposed in a middle portion of the touch panel 100.

Red, green, and blue color filters for displaying a full-color image may be provided on a rear surface or a top of the color filter array substrate 120. A black matrix for dividing adjacent pixels may be provided between adjacent color filters.

Here, the plurality of touch sensors 130 may be used as a common electrode for displaying an image. That is, in a display period of one frame period, a common voltage Vcom may be supplied to the plurality of touch sensors 130, thereby displaying an image. Also, in a touch period of the one frame period, a touch driving signal TDS may be supplied to the plurality of touch sensors 130, and a touch position and pressure which is applied to the touch panel 100 when a touch is being performed may be sensed based on a capacitance variation of each of the touch sensors 130. In this instance, the touch position and the touch pressure which is applied to the touch panel 100 when the touch is being performed may be sensed in an all point self-capacitance touch type. Here, each of the plurality of touch sensors 130 may be provided in an area of 3.5 mm$^2$ to 4.5 mm$^2$ so as to sense the touch position and the pressure.

The elastic layer 140 may be formed of resin having an adhesive force. The color filter array substrate 120 may be adhered to a bottom of the elastic layer 140, and the cover glass 150 may be adhered to a top of the elastic layer 140.

The elastic layer 140 may be formed of a material which is transparent and has an elastic force and a permittivity of 1 to 3. The elastic layer 140 may have a high-level elastic force and thus may have a feature where when pressure is applied to the elastic layer 140, the elastic layer 140 is compressed, and when the pressure is released, the elastic layer 140 is restored to an original state. For example, the elastic layer 140 may be formed of polydimethylsiloxane (PDMS), acryl, poly-urethane, and/or the like. However, the present embodiment is not limited thereto, and all materials which have an elastic force and a permittivity of 1 to 3 may be used as a material of the elastic layer 140 without being limited.

Hereinabove, it has been described that the plurality of touch sensors 130 are arranged in the touch panel in an in-cell touch type. However, the present embodiment is not limited thereto. In other embodiments, the plurality of touch sensors 130 may be arranged on a TFT array substrate of an organic light emitting display device.

As illustrated in FIG. 4, a thickness of the elastic layer 140 may be changed by pressure applied thereto when a touch is being performed, and a capacitance of the touch sensor 130 may vary due to the change in thickness of the elastic layer 140. Therefore, in addition to a touch position, the pressure which is applied to the touch panel when the touch is being performed may be sensed based on a capacitance variation sensed from the touch sensor 130.

$$C = \varepsilon \frac{A}{d} \quad (1)$$

where C denotes a capacitance of the touch sensor 130, ε denotes a permittivity of the elastic layer 140, A denotes an area of the touch sensor 130, and d denotes a distance between the touch sensor 130 and the cover glass 150.

The area of the touch sensor 130 and the permittivity "ε" of the elastic layer 140 may be fixed, and thus, the capacitance of the touch sensor 130 may vary based on the distance "d" between the touch sensor 130 and the cover glass 150.

That is, the elastic layer 140 may be pressed by a force (pressure) applied to the cover glass 150, and thus, a distance between a finger and the touch sensor 130 may be reduced, whereby a capacitance charged into the touch sensor 130 may vary.

Figure 5:
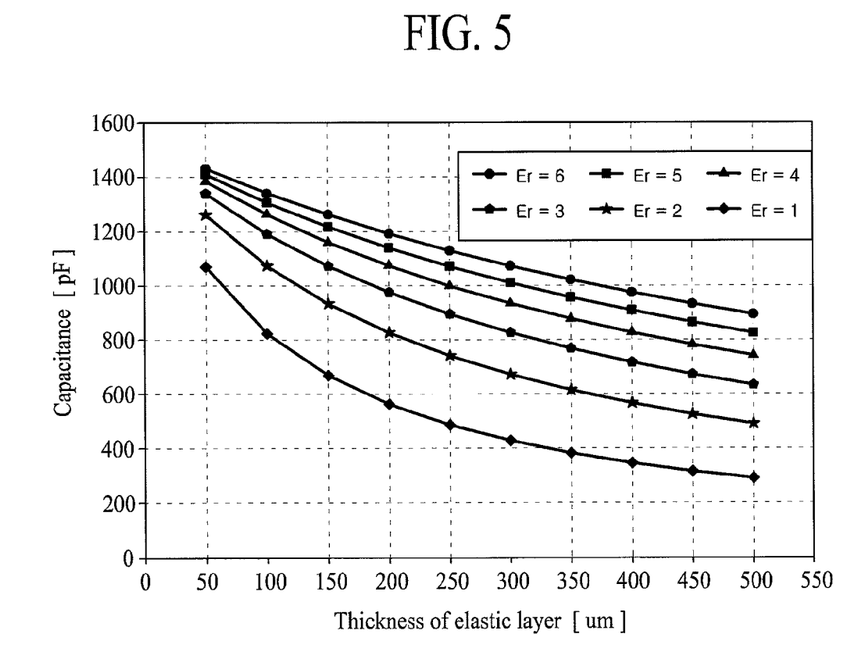
FIG. 5 is a diagram showing a variation of a capacitance caused by a permittivity of the elastic layer according to an embodiment of the present invention.

FIG. 5 is a diagram showing a variation of a capacitance caused by the permittivity of the elastic layer.

Referring to FIG. 5, an experiment on a variation of a capacitance has been made by changing the permittivity of the elastic layer 140 to 1, 2, 3, 4, 5 and 6, and a result of the experiment is shown in FIG. 5. It can be seen that the lower the permittivity of the elastic layer 140, the higher the capacitance variation rate.

In this instance, as the permittivity of the elastic layer 140 becomes lower, an absolute value of a capacitance is reduced. However, it can be seen that as the permittivity of the elastic layer 140 becomes lower, a capacitance variation rate (slope) based on a thickness change of the elastic layer 140 increases. Therefore, it may be considered that as the permittivity of the elastic layer 140 becomes lower, pressure is easily sensed. However, the experiment is not limited thereto, and another experiment has been made on dividable pressure levels and a variation of a capacitance caused by a change in thickness of the elastic layer 140. A result of the other experiment is listed in the following Table 1. The experiment result of the following Table 1 is a result obtained by applying the cover glass having a thickness of 5 mm.

$$C1 = \varepsilon \frac{A}{d}, \quad C2 = \varepsilon \frac{A}{(d - \Delta d)} \quad (2)$$

As seen in Equation (2), it can be seen that a distance between a finger and the touch sensor 130 changes (Δd) according to pressure which is applied when a touch is being performed, and thus, a capacitance of the touch sensor 130 varies.

TABLE 1 capacitance variation based on thickness change of elastic layer & pressure level division

|  | 4% | 8% | ~ | 44% | 48% | 52% | 56% | 60% | 64% | 68% | 72% | 76% | 80% | 84% | 88% | 92% | 96% |
|---|---|---|---|---|---|---|---|---|---|---|---|---|---|---|---|---|---|
| ε = 1 | 0.01 | 0.02 | ~ | 0.15 | 0.18 | 0.20 | 0.23 | 0.26 | 0.29 | 0.33 | 0.38 | 0.43 | 0.50 | 0.57 | 0.66 | 0.77 | 0.91 |
| ε = 2 | 0.01 | 0.03 | ~ | 0.19 | 0.22 | 0.25 | 0.28 | 0.31 | 0.34 | 0.38 | 0.43 | 0.47 | 0.53 | 0.58 | 0.65 | 0.73 | 0.81 |
| ε = 3 | 0.01 | 0.03 | ~ | 0.20 | 0.22 | 0.25 | 0.28 | 0.31 | 0.34 | 0.37 | 0.41 | 0.45 | 0.50 | 0.54 | 0.59 | 0.65 | 0.71 |
| ε = 4 | 0.01 | 0.03 | ~ | 0.19 | 0.22 | 0.24 | 0.27 | 0.29 | 0.32 | 0.35 | 0.39 | 0.42 | 0.46 | 0.49 | 0.54 | 0.58 | 0.63 |
| ε = 5 | 0.01 | 0.03 | ~ | 0.19 | 0.21 | 0.23 | 0.25 | 0.28 | 0.30 | 0.33 | 0.36 | 0.39 | 0.42 | 0.45 | 0.49 | 0.52 | 0.56 |
| ε = 6 | 0.01 | 0.03 | ~ | 0.18 | 0.19 | 0.22 | 0.24 | 0.26 | 0.28 | 0.31 | 0.33 | 0.36 | 0.38 | 0.41 | 0.44 | 0.47 | 0.51 |

- first level
- second level
- third level
- fourth level
- fifth level

As seen in Table 1, a thickness change of the elastic layer 140 caused by pressure which is applied when a touch is being performed is subdivided into 4% to 96%, and the permittivity of the elastic layer 140 is divided into 1 to 6. Under such conditions, a capacitance variation based on the thickness change of the elastic layer 140 has been checked.

Numbers listed in Table 1 are capacitance values represented by pF in unit. For example, when a thickness of 300 µm of the elastic layer 140 changes by 4% and thus the elastic layer 140 is compressed to a thickness of 288 µm, it can be seen through Table 1 that if the permittivity of the elastic layer 140 is 1, a capacitance variation of 0.01 pF occurs. A point at which colors corresponding to the capacitance values in Table 1 change denotes that a variation of a capacitance occurs to a degree to which a next pressure level is distinguished from a previous pressure level. Accordingly, a degree to which a pressure level is subdivided is analogized.

The first level in Table 1 denotes a soft touch state and denotes that a touch is applied to the cover glass 150, but pressure less than a pressure sensing threshold value is applied to the cover glass 150.

If the permittivity of the elastic layer 140 is 4 to 6, pressure is divided into two levels including the soft touch state. That is, except for the soft touch state, it is unable to actually divide, by levels, pressure which is applied when a touch is being performed.

Moreover, if the permittivity of the elastic layer 140 is 3, pressure is divided into three levels including the soft touch state. That is, except for the soft touch state, pressure which is applied when a touch is being performed is divided into two levels.

Moreover, if the permittivity of the elastic layer 140 is 2, pressure is divided into four levels including the soft touch state. That is, except for the soft touch state, pressure which is applied when a touch is being performed is divided into three levels.

Moreover, if the permittivity of the elastic layer 140 is 1, pressure is divided into five levels including the soft touch state. That is, except for the soft touch state, pressure which is applied when a touch is being performed is divided into four levels.

In the present invention, the permittivity of the elastic layer 140 is adjusted to 1 to 3, based on FIG. 5 and the experiment result of Table 1, and thus, pressure which is applied when a touch is being performed is divided into two to four levels.

Referring again to FIG. 3, the touch driver 200 may include a touch driving signal generator 210, a touch sensing unit 220, and a switch driver 230. The display driver 300 may include a plurality of touch drive integrated circuits (ICs) 310. The plurality of touch drive ICs 310 may each include a data driver and a gate driver.

The timing controller 400 may generate a gate control signal GCS for controlling the gate driver by using a timing signal TS and may supply the gate control signal GCS to the gate driver. The gate driving signal GCS may include a gate start pulse GSP, a gate shift clock GSC, a gate output enable signal GOE, etc.

Moreover, the timing controller 400 may generate a data control signal DCS for controlling the data driver by using the timing signal TS and may supply the data control signal to the data driver. The data control signal DCS may include a source start pulse SSP, a source sampling clock SSC, a source output enable signal SOE, a polarity control signal POL, etc.

Moreover, the timing controller 400 may convert input RGB image signals into frame-unit digital RGB image data by using the timing signal TS and may supply the RGB image data to the data driver. In this instance, the timing signal TS may include a vertical synchronization signal V-sync, a horizontal synchronization signal H-sync, and a clock signal CLK.

Moreover, the timing controller 400 may generate a touch control signal TCS for controlling the touch driver 200 and may supply the touch control signal TCS to the touch driver 200. The touch control signal TCS may include a synchronization signal of the display period and the touch period in order for the touch driver 200 to be driven in the touch period.

Figure 6:
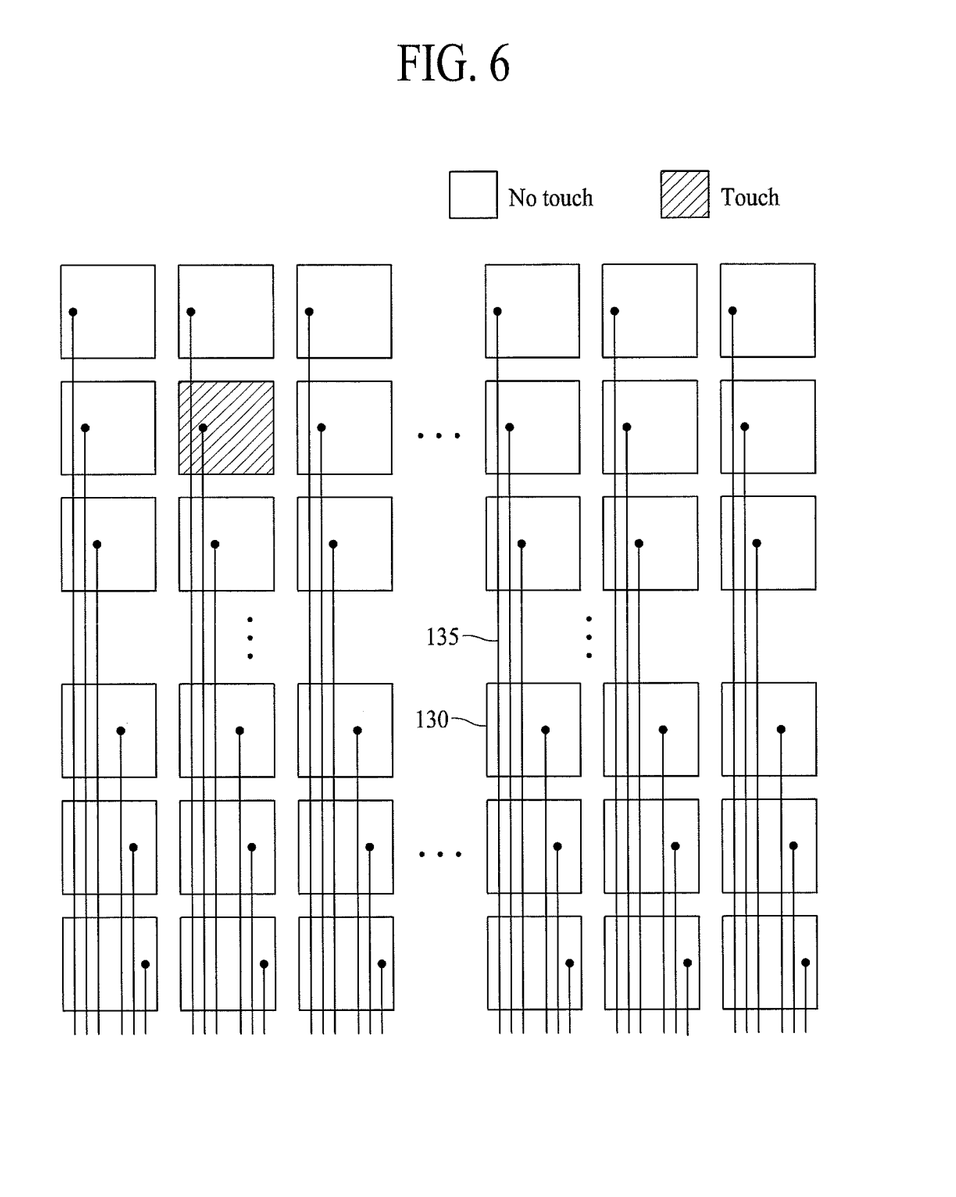
FIG. 6 is a diagram illustrating an operation of sensing a soft touch according to an embodiment of the present invention.
Figure 7:
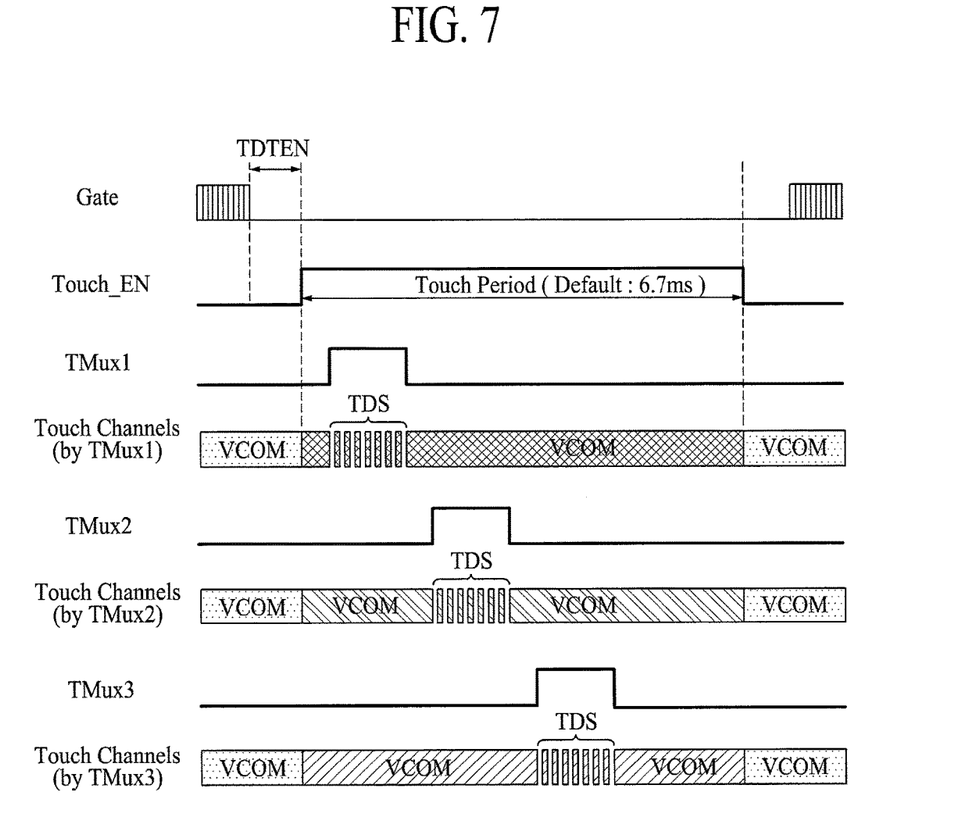
FIG. 7 is a diagram showing a touch driving signal for sensing a soft touch according to an embodiment of the present invention.

FIG. 6 is a diagram illustrating an operation of sensing a soft touch, and FIG. 7 is a diagram showing a touch driving signal for sensing a soft touch.

Referring to FIGS. 3, 6 and 7, the touch driving signal generator 210 of the touch driver 200 may generate the touch driving signal TDS, based on the touch control signal TCS supplied from the timing controller 400. Also, in one frame period, the touch driving signal TDS may be applied to the plurality of touch sensors 130 disposed in the touch panel in the touch period. The plurality of touch sensors 130 may be respectively connected to a plurality of touch lines 135, and the plurality of touch lines 135 may be connected to the touch driver 200. An electric charge may be charged into each of the plurality of touch sensors 130 by the touch driving signal.

Subsequently, the touch sensing unit 220 of the touch driver 200 may receive a capacitance charged into each of the plurality of touch sensors 130. Then, a capacitance variation of each of the plurality of touch sensors 130 may be detected. Based on the detected capacitance variation, whether there is a touch may be determined, and a touch position may be detected.

Here, the touch driver 200 may include a plurality of multiplexers 132 having an input-to-output ratio of N:1 for decreasing the number of input/output channels of the touch driver 200. The plurality of multiplexers 210 may be disposed between an input/output terminal of a signal generator and a plurality of channels, thereby decreasing the total number of the channels of the touch driver 200 by 1/N.

In FIG. 3, it is illustrated that three multiplexers MUX1 to MUX3 are provided, and thus, the number of input/output channels of the touch driver 200 decreases by ⅓. Also, it is illustrated that the plurality of touch sensors 130 disposed in the touch panel 100 is divided into three blocks, the touch driving signal TDS is supplied to the touch sensors 130, and a capacitance of each of the touch sensors 130 is sensed.

Figure 8:
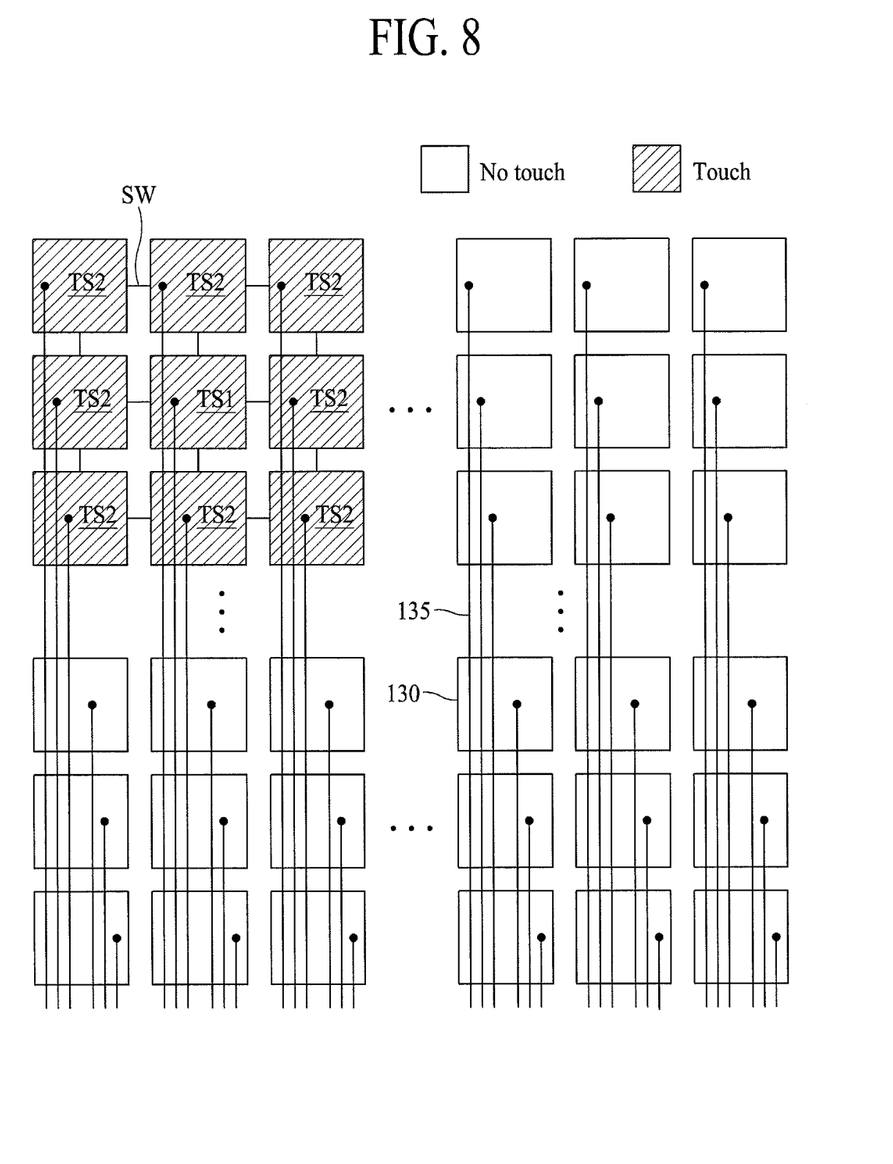
FIG. 8 is a diagram illustrating an operation of sensing a pressure touch according to an embodiment of the present invention.
Figure 9:
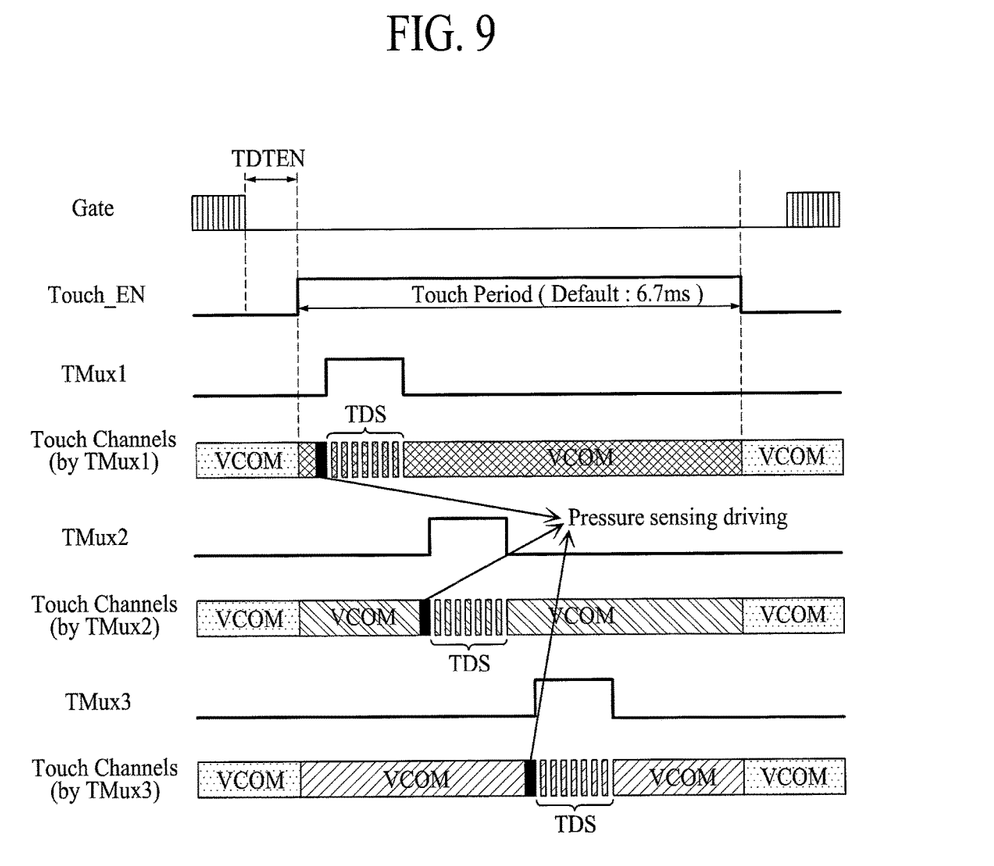
FIG. 9 is a diagram showing a touch driving signal for sensing a pressure touch according to an embodiment of the present invention.

FIG. 8 is a diagram illustrating an operation of sensing a pressure touch. FIG. 9 is a diagram showing a touch driving signal for sensing a pressure touch.

Referring to FIGS. 3, 8 and 9, a plurality of switches SW electrically connecting a plurality of touch sensors which are adjacent to each other in up, down, left, and right directions may be provided in the touch panel 100. When a touch is sensed from a first touch sensor TS1, the switch driver 230 may generate a switch enable signal and may supply the generated switch enable signal to a plurality of switches disposed between the first touch sensor TS1 and a plurality of second touch sensors TS2 surrounding the first touch sensor TS1.

The first touch sensor TS1 may be electrically connected to the plurality of second touch sensors TS2 by turning on the plurality of switches disposed between the first touch sensor TS1 and the plurality of second touch sensors TS2 surrounding the first touch sensor TS1, and by turning on switches disposed between adjacent second touch sensors TS2 among the plurality of second touch sensors surrounding the first touch sensor TS1 to electrically connect the adjacent second touch sensors TS2 among the plurality of second touch sensors surrounding the first touch sensor TS1 to each other.

When a touch is sensed from an arbitrary first touch sensor among the plurality of touch sensors 130 as a soft touch sensing result, the touch driving signal generator 210 may supply the touch driving signal to the plurality of touch sensors 130. Subsequently, the touch sensing unit 220 may receive a capacitance charged into each of the first touch sensor TS1 and the plurality of second touch sensors TS2 surrounding the first touch sensor TS1. Subsequently, pressure which is applied when a touch is being performed may be sensed based on a capacitance variation of each of the first touch sensor TS1 and the plurality of second touch sensors TS2.

Pressure which is applied when a touch is being performed cannot be precisely sensed based on a capacitance of one touch sensor 130. Also, although pressure is applied when a touch is being performed, since an area where a finger contacts the cover glass is enlarged, the pressure which is applied when the touch is being performed may be sensed by receiving capacitances of a plurality of touch sensors. Therefore, according to an embodiment of the present invention, an influence of noise on pressure sensing is reduced, and pressure which is applied when a touch is being performed may be sensed based on capacitance variations of the plurality of second touch sensors TS2 as well as a capacitance variation of the first touch sensor TS1.

The touch sensing unit 220 may include a look-up table storing a capacitance variation rate based on pressure, in order to sense pressure based on capacitance variations of touch sensors. The touch sensing unit 220 may compare capacitance variations of the first touch sensor TS1 and the plurality of second touch sensors TS2 with data of the look-up table to sense pressure which is applied when a touch is being performed. In this instance, if the permittivity of the elastic layer 140 is 1 to 3, the pressure which is applied when the touch is being performed may be divided into two to four levels and may be sensed.

Since the related art touch panel senses only a touch position, it is unable to provide various user interfaces based touch sensing. Further, in the touch display device and the method of driving the same according to an embodiment of the present invention, pressure which is applied when a touch is being performed may be divided into a plurality of levels and may be sensed, thereby providing various user interfaces according to pressure levels.

In FIG. 8, it is illustrated that pressure which is applied when a touch is being performed is sensed based on capacitance variations of a total of nine touch sensors 130 including the first touch sensor TS1 and the second touch sensors TS2. However, the present embodiment is not limited thereto. In other embodiments, the touch panel 100 may further include sixteen touch sensors 130 which are disposed to surround the plurality of second touch sensors TS2, in addition to the first touch sensor TS1 and the plurality of second touch sensors TS2. Accordingly, the touch driving signal may be supplied to a total of twenty-five touch sensors including the sixteen touch sensors 130 which are disposed to surround the plurality of second touch sensors TS2, and pressure which is applied when a touch is being performed may be sensed based on capacitance variations of the twenty-five touch sensors.

Elements and functions of the above-described touch display device according to an embodiment of the present invention will be described below.

The touch display device according to an embodiment of the present invention may include the touch panel 100 and a driving circuit unit. The elastic layer 140 may be arranged on the second substrate 120 of the touch panel 100, and the cover glass 150 may be disposed on the elastic layer 140. A plurality of subpixels may be arranged in the touch panel 100, and the plurality of touch sensors 130 may be arranged in units of a certain number of subpixels. The driving circuit unit may include the timing controller 400, the display driver 300, and the touch driver 200. The display driver 300 may supply image signals to the plurality of subpixels, respectively. Also, the touch driver 200 may supply the touch driving signal to the plurality of touch sensors 130 and may sense a touch position and pressure which is applied when a touch is being performed, based on a capacitance variation of each of the plurality of touch sensors 130.

The touch display device according to an embodiment of the present invention may include the plurality of switches SW electrically connecting a plurality of touch sensors which are adjacent to each other in up, down, left, and right directions.

When a touch is sensed from the first touch sensor TS1 among the plurality of touch sensors 130, the touch driver 200 may turn on the plurality of switches SW disposed between the first touch sensor TS1 and the plurality of second touch sensors TS2 surrounding the first touch sensor TS1, thereby electrically connecting the first touch sensor TS1 to the plurality of second touch sensors TS2, and turns on switches disposed between adjacent second touch sensors TS2 among the plurality of second touch sensors surrounding the first touch sensor TS1 to electrically connect the adjacent second touch sensors TS2 among the plurality of second touch sensors surrounding the first touch sensor TS1 to each other. Also, the touch driver 200 may supply the touch driving signal TDS to the first touch sensor TS1 and the plurality of second touch sensors TS2. Also, the touch driver 200 may sense pressure which is applied when a touch is being performed, based on capacitance variations of the first touch sensor TS1 and the plurality of second touch sensors TS2.

The touch display device according to an embodiment of the present invention may sense pressure which is applied when a touch is being performed, based on a variation of a capacitance caused by a change in thickness of the elastic layer 140. Here, the permittivity of the elastic layer 140 may be 1 to 3. In the touch display device according to an embodiment of the present invention, an area of each of the plurality of touch sensors 130 may be 3.5 mm$^2$ to 4.5 mm$^2$.

In the present embodiment, pressure which is applied when a touch is being performed may be divided into two or more levels, thereby providing various user interfaces according to pressure levels.

In an operation of sensing touch pressure, the touch driving signal TDS may be supplied to a total of nine touch sensors including the first touch sensor TS1. Also, pressure which is applied when a touch is being performed may be sensed based on capacitance variations of the nine touch sensors.

Moreover, in an operation of sensing touch pressure, the touch driving signal TDS may be supplied to twenty-five touch sensors including the first touch sensor TS1. Also, pressure which is applied when a touch is being performed may be sensed based on capacitance variations of the twenty-five touch sensors.

As described above, the touch display device and the method of driving the same according to the embodiments of the present invention may sense a touch position and a force by using the plurality of touch sensors which are arranged in the in-cell touch type.

Moreover, the touch display device and the method of driving the same according to the embodiments of the present invention may sense both a touch position and a force by using the same touch sensor.

Moreover, in the touch display device and the method of driving the same according to the embodiments of the present invention, since the plurality of touch sensors for sensing a touch position and a force are arranged in the in-cell touch type, a thickness of the touch display device is reduced.

Moreover, the touch display device and the method of driving the same according to the embodiments of the present invention may divide, by levels, a touch pressure which is applied to the touch panel when a touch is being performed, thereby providing different user interfaces based on levels of the touch pressure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch display device comprising:
   a touch panel configured to display an image, the touch panel including a plurality of subpixels arranged between a first substrate and a second substrate, and a plurality of touch sensors arranged in units of a certain number of subpixels;
   an elastic layer on the second substrate;
   a display driver configured to supply image signals to the plurality of subpixels, respectively; and
   a touch driver configured to supply a touch driving signal to the plurality of touch sensors, sense a touch position of a touch based on a capacitance variation of a first touch sensor among the plurality of touch sensors, supply the touch driving signal to the first touch sensor and a plurality of second touch sensors surrounding the first touch sensor among the plurality of touch sensors, and sense a touch pressure of the touch position based on capacitance variations of the first touch sensor and the plurality of second touch sensors.

2. The touch display device of claim 1, further comprising: a plurality of switches electrically connected to the plurality of touch sensors,
   wherein the plurality of switches are adjacent to each other in up, down, left, and right directions.

3. The touch display device of claim 2, wherein when the touch is sensed from the first touch sensor, the touch driver turns on a plurality of switches disposed between the first touch sensor and the plurality of second touch sensors to electrically connect the first touch sensor to the plurality of second touch sensors, and turns on switches disposed between adjacent second touch sensors among the plurality of second touch sensors to electrically connect the adjacent second touch sensors among the plurality of second touch sensors.

4. The touch display device of claim 3, wherein a thickness of the elastic layer is changed by a force of the touch pressure, and the touch pressure is sensed based on a variation of a capacitance caused by the change in thickness of the elastic layer.

5. The touch display device of claim 4, wherein the touch pressure is divided into two or more levels.

6. The touch display device of claim 1, wherein a permittivity of the elastic layer is a value among 1 to 3.

7. The touch display device of claim 6, wherein the touch pressure is divided into two to four levels.

8. The touch display device of claim 1, wherein the plurality of touch sensors form a common electrode supplied with a common voltage during a display period for displaying the image.

9. A method of driving a touch display device, the method comprising:
   supplying a touch driving signal to a plurality of touch sensors arranged in a touch panel;
   sensing a touch position, based on a capacitance variation of each of the plurality of touch sensors;
   in response to sensing a touch from a first touch sensor among the plurality of touch sensors, electrically connecting the first touch sensor to a plurality of second touch sensors surrounding the first touch sensor;
   supplying the touch driving signal to the first touch sensor and the plurality of second touch sensors surrounding the first touch sensor; and
   sensing a touch pressure of the touch, based on capacitance variations of the first touch sensor and the plurality of second touch sensors.

10. The method of claim 9, further comprising:
    determining a touch pressure level for the touch pressure among a plurality of touch pressure levels, wherein the plurality of touch pressure levels are divided into two or more levels; and
    providing a user interface based on the touch pressure level, wherein the touch pressure levels correspond to various user interfaces.

11. The method of claim 9, further comprising:
    supplying the touch driving signal to nine touch sensors including the first touch sensor; and
    sensing the touch pressure when the touch is input to the touch panel based on capacitance variations of the nine touch sensors.

12. The method of claim 9, further comprising:
    supplying the touch driving signal to twenty-five touch sensors including the first touch sensor; and
    sensing the touch pressure when the touch is input to the touch panel based on capacitance variations of the twenty-five touch sensors.

13. A touch display device comprising:
    a touch panel configured to display an image, the touch panel including a plurality of subpixels arranged between a first substrate and a second substrate, and a plurality of touch sensors arranged in units of a certain number of subpixels;
    an elastic layer on the second substrate;
    a plurality of switches electrically connected to the plurality of touch sensors; and
    a controller configured to:
      divide a frame period into a display period for displaying the image and a touch period for touch sensing,
      sense a touch input to the touch panel during the touch period by at least one touch sensor among the plurality of touch sensors,
      turn on a set of switches among the plurality of switches and electrically connect the at least one touch sensor to a plurality of touch sensors surrounding the at least one touch sensor, in response to sensing the touch input by the at least one touch sensor,
      supply a touch driving signal to the at least one touch sensor and the plurality of touch sensors surrounding the at least one touch sensor, and
      sense a touch position and a touch pressure of the touch input based on the touch driving signal, wherein the touch pressure is based on a capacitance variation of the at least one touch sensor and the plurality of touch sensors surrounding the at least one touch sensor, and wherein the plurality of touch sensors form a common electrode supplied with a common voltage during the display period for displaying the image.

14. The touch display device of claim 13, wherein the plurality of switches are adjacent to each other in up, down, left, and right directions.

15. The touch display device of claim 13, wherein a thickness of the elastic layer is changed by a force of the touch pressure, and the touch pressure is sensed based on a variation of a capacitance caused by the change in thickness of the elastic layer.

16. The touch display device of claim 13, wherein the controller is further configured to:

determine a touch pressure level for the touch pressure among a plurality of touch pressure levels, wherein the plurality of touch pressure levels are divided into two or more levels, and the two or more levels correspond to predetermined capacitance variations.

17. The touch display device of claim 16, wherein the touch pressure level is determined based on matching the touch pressure to one of the plurality of pressure levels in a look-up table.

18. The touch display device of claim 13, wherein the plurality of touch sensors surrounding the at least one touch sensor include nine to twenty-five touch sensors.

* * * * *